(12) United States Patent
Copeland et al.

(10) Patent No.: US 9,757,600 B2
(45) Date of Patent: Sep. 12, 2017

(54) FIRE EXTINGUISHER MOUNTING BRACKET FOR VEHICLE

(71) Applicant: Sears Manufacturing Co., Davenport, IA (US)

(72) Inventors: Mark A. Copeland, Silvis, IL (US); Dennis J. Gryp, East Moline, IL (US)

(73) Assignee: Sears Manufacturing Co., Davenport, IA (US)

( * ) Notice: Subject to any disclaimer, the term of this patent is extended or adjusted under 35 U.S.C. 154(b) by 170 days.

(21) Appl. No.: 14/521,633

(22) Filed: Oct. 23, 2014

(65) Prior Publication Data

US 2016/0114202 A1  Apr. 28, 2016

(51) Int. Cl.
| | | |
|---|---|---|
| *A62C 13/78* | (2006.01) | |
| *A62C 3/07* | (2006.01) | |
| *F16M 11/10* | (2006.01) | |
| *B60N 3/10* | (2006.01) | |
| *B65D 21/02* | (2006.01) | |

(52) U.S. Cl.
CPC ............... *A62C 13/78* (2013.01); *A62C 3/07* (2013.01); *B60N 3/105* (2013.01); *B60N 3/107* (2013.01); *B65D 21/02* (2013.01); *F16M 11/10* (2013.01); *F16M 11/105* (2013.01)

(58) Field of Classification Search
CPC ........ B60N 3/105; B60N 3/107; A62C 13/78; A62C 3/07; F16M 11/10; F16M 11/105; B65D 21/02; B65D 21/0233; B65D 21/086
USPC .... 169/51; 248/125.9, 130, 310, 311.2, 312, 248/313, 314, 349.1, 521, 135, 137, 248/145.3, 309.2; 221/71.01, 74, 75, 77, 221/81, 85, 78; 220/504, 4.01, 8, 23.83, 220/23.86; 108/6, 139
See application file for complete search history.

(56) References Cited

U.S. PATENT DOCUMENTS

| | | | | | |
|---|---|---|---|---|---|
| 2,499,672 | A | * | 3/1950 | Nurkiewicz | A62C 13/78 169/30 |
| 3,204,775 | A | * | 9/1965 | Smith | A62B 9/04 211/75 |
| 3,980,264 | A | * | 9/1976 | Tomasik | E06C 7/14 248/110 |
| D580,228 | S | * | 11/2008 | Hayden | D7/509 |
| 8,757,573 | B1 | * | 6/2014 | Barnes, Jr. | A47G 23/0225 220/737 |
| 8,998,158 | B2 | * | 4/2015 | St. Jacques | A01K 5/0135 248/205.5 |
| 2002/0070324 | A1 | * | 6/2002 | Huang | A47G 23/0225 248/311.2 |
| 2005/0040309 | A1 | * | 2/2005 | Paine | A47G 19/08 248/346.5 |
| 2009/0250582 | A1 | * | 10/2009 | Ziaylek | A62B 25/00 248/312 |

(Continued)

OTHER PUBLICATIONS

STIC patent search results.*

*Primary Examiner* — Alexander Valvis
(74) *Attorney, Agent, or Firm* — Lane & Waterman LLP (57) ABSTRACT

A mounting bracket for a fire extinguisher which has a base configured for attachment to a vehicle or seat; an endcap pivotably mounted to the base, wherein the endcap includes at least one receptacle which is configured to accommodate a fire extinguisher tank; and a neck clamp configured to engage a bottle neck on a fire extinguisher.

6 Claims, 7 Drawing Sheets

(56) References Cited

U.S. PATENT DOCUMENTS

2012/0286120 A1\* 11/2012 Ziaylek ................ F17C 13/084
248/312

\* cited by examiner

FIRE EXTINGUISHER MOUNTING BRACKET FOR VEHICLE

BACKGROUND

The present disclosure relates to an apparatus for securing fire extinguishers in vehicles, and more particularly to a quick-release mounting bracket capable of securing fire extinguishers of different dimensions.

Many commercial vehicle cabs are required to be equipped with at least one fire extinguisher. Generally, federal and state regulations require the fire extinguisher to be easily accessible and securely mounted within the vehicle cab. The regulations also govern the size of the fire extinguisher required in the vehicle cab. Generally, vehicles that transport hazardous materials must have a larger fire extinguisher than those vehicles that do not transport hazardous materials. In addition, the mounting of the fire extinguisher must be secure for safety reasons such as to prevent jostling and puncture of the fire extinguisher.

There is a need, therefore, for a mounting bracket that can securely hold multiple sizes of fire extinguishers in a vehicle, and which allows a passenger to easily disengage the fire extinguisher in an emergency.

SUMMARY OF THE INVENTION

The present invention is directed to a fire extinguisher mounting bracket for use in a vehicle having a base configured for attachment to the vehicle, an endcap pivotably mounted to the base, wherein the endcap comprises at least one receptacle which is configured to accommodate a fire extinguisher tank, and a neck clamp configured to engage a bottle neck on a fire extinguisher. In one embodiment, the endcap has two receptacles, and the receptacle is selectable by pivoting the endcap. In another aspect, a fire extinguisher mounting bracket is provided wherein the neck clamp further comprises a collar and tension clip such that the collar urges the fire extinguisher towards the receptacle while the tension clip holds the bottle neck in place.

The above-described features and advantages, as well as others, will become more readily apparent to those of ordinary skill in the art by reference to the following detailed description and accompanying drawings. While it would be desirable to provide a vehicle fire extinguisher mounting bracket that includes one or more of these advantageous features, the teachings disclosed herein extend to those embodiments which fall within the scope of the appended claims, regardless of whether they accomplish one or more of the above-mentioned advantages.

DETAILED DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which the invention pertains.

Figure 1:
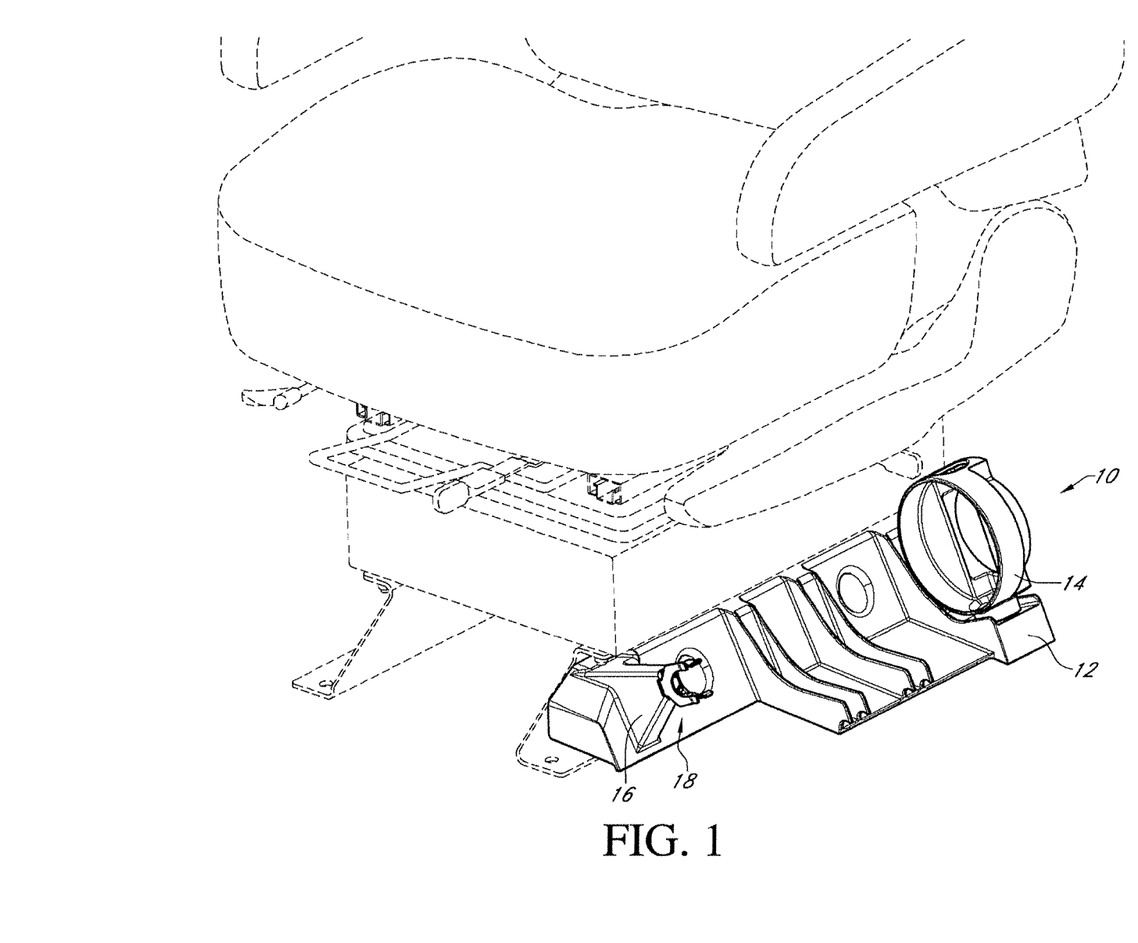
FIG. 1 is a perspective view of the apparatus incorporating features of the present disclosure.
Figure 2:
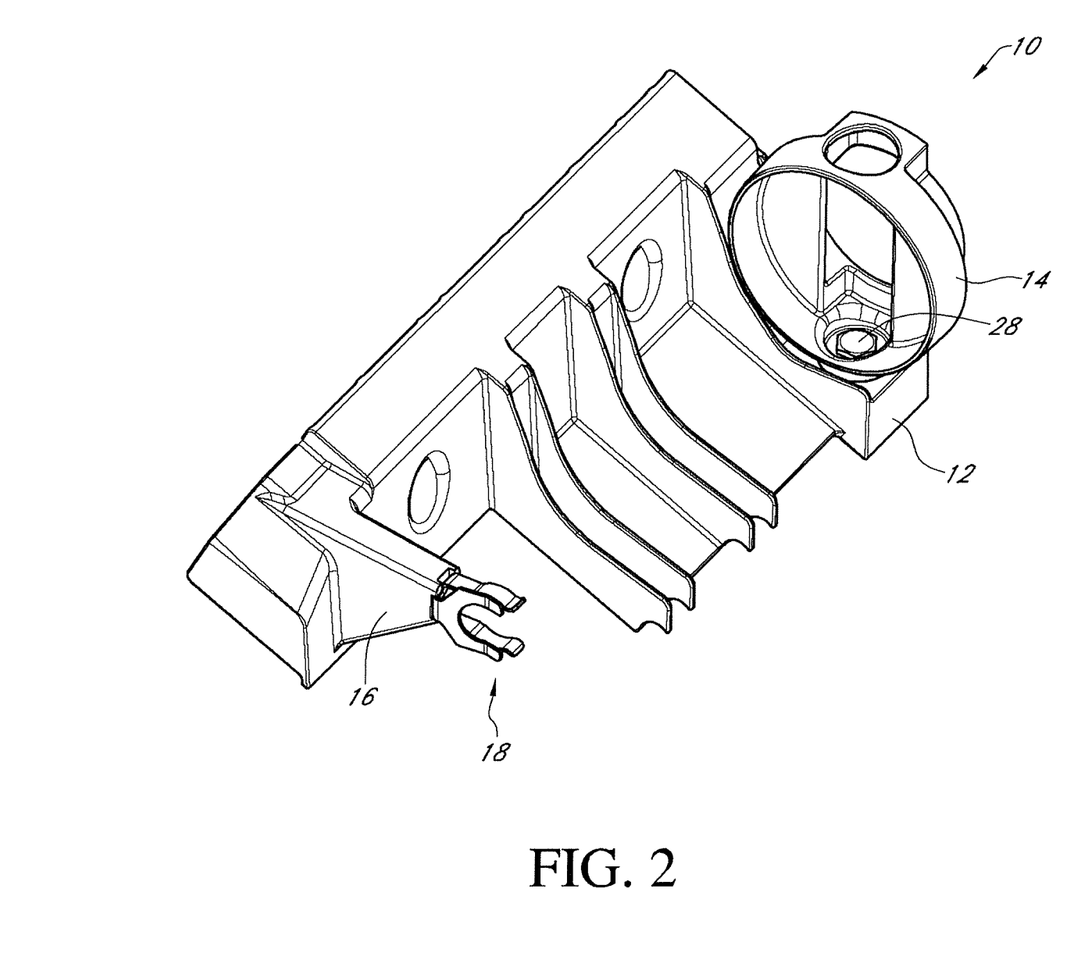
FIG. 2 is a perspective view of the apparatus shown in FIG. 1.

One type of a mounting bracket 10 for a fire extinguisher is shown in FIGS. 1 and 2. The mounting bracket 10 includes a base 12 that can be attached to a seat in a vehicle cab. The base 12 may also be attached to the floor, wall, or ceiling of the vehicle cab so long as the requirement of the laws and regulations governing the placement of the extinguisher are met. The base 12 may be constructed of metal, or plastic or any other suitable material. The base 12 includes an endcap 14 at one end. The endcap 14 is rotatably mounted to the base 12 as will be explained in more detail. At its other end, the base 12 includes an arm 16 that extends outward and comprises a neck clamp 18 (as best shown in FIG. 4).

Figure 3A:
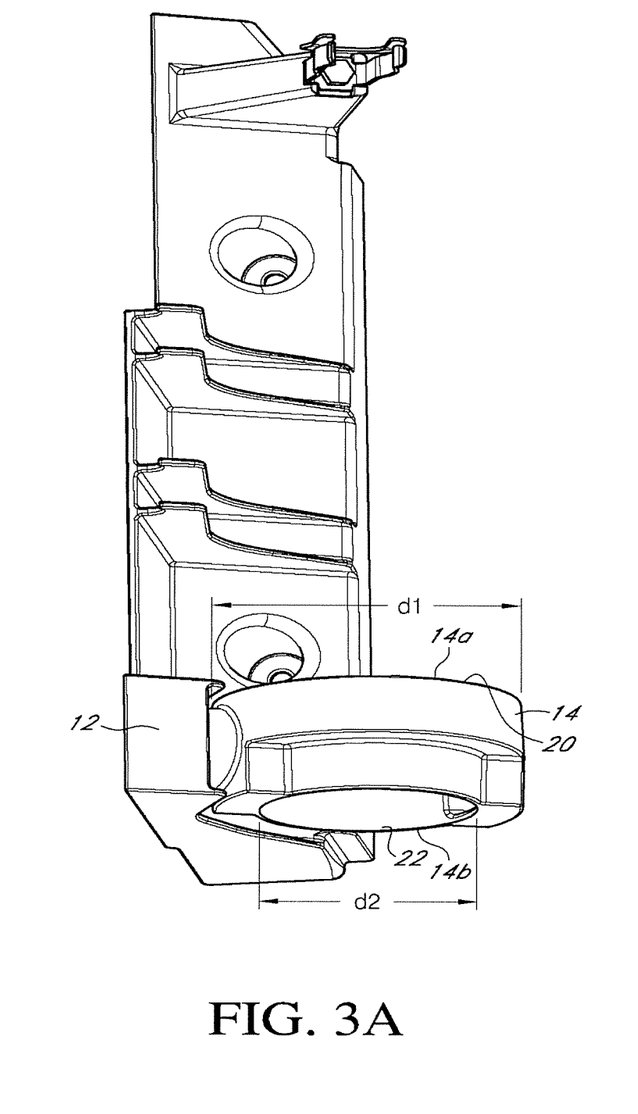
FIG. 3a is a perspective view of the apparatus with the larger diameter receptacle positioned for engagement with a fire extinguisher.
Figure 3B:
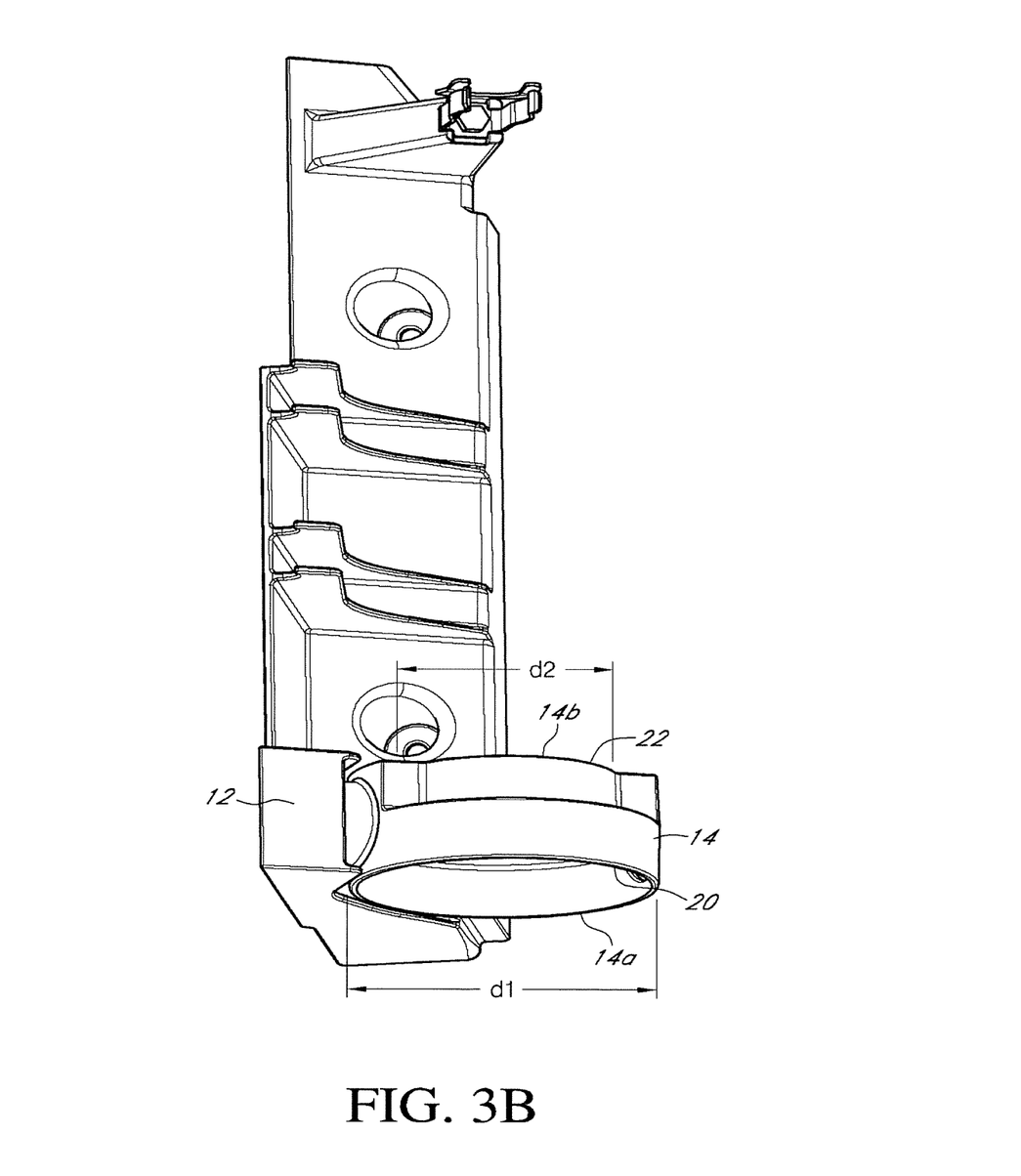
FIG. 3b is a perspective view of the apparatus with the smaller diameter receptacle positioned for engagement with a fire extinguisher.

As shown in FIGS. 3a and 3b, the endcap 14 has two sides, 14a and 14b. Side 14a has a receptacle 20 that has a diameter d1 that is suited to accommodate larger fire extinguishers. Side 14b has a receptacle 22 that has a diameter d2 that is suited to accommodate smaller diameter fire extinguishers. It is common in the transportation industry for one of two different sizes of fire extinguishers to be required, depending on the cargo. As can be appreciated, the endcap 14 can be rotated such that the side 14a can be engaged when a larger fire extinguisher is required and side 14b can be engaged when a smaller fire extinguisher is sufficient. It can also be appreciated that endcap 14 can include a variable sized receptacle (not shown) that can be adjusted to accommodate the tank diameter, by means of, for example, a sleeve or an adjustable clamp.

Figure 4:
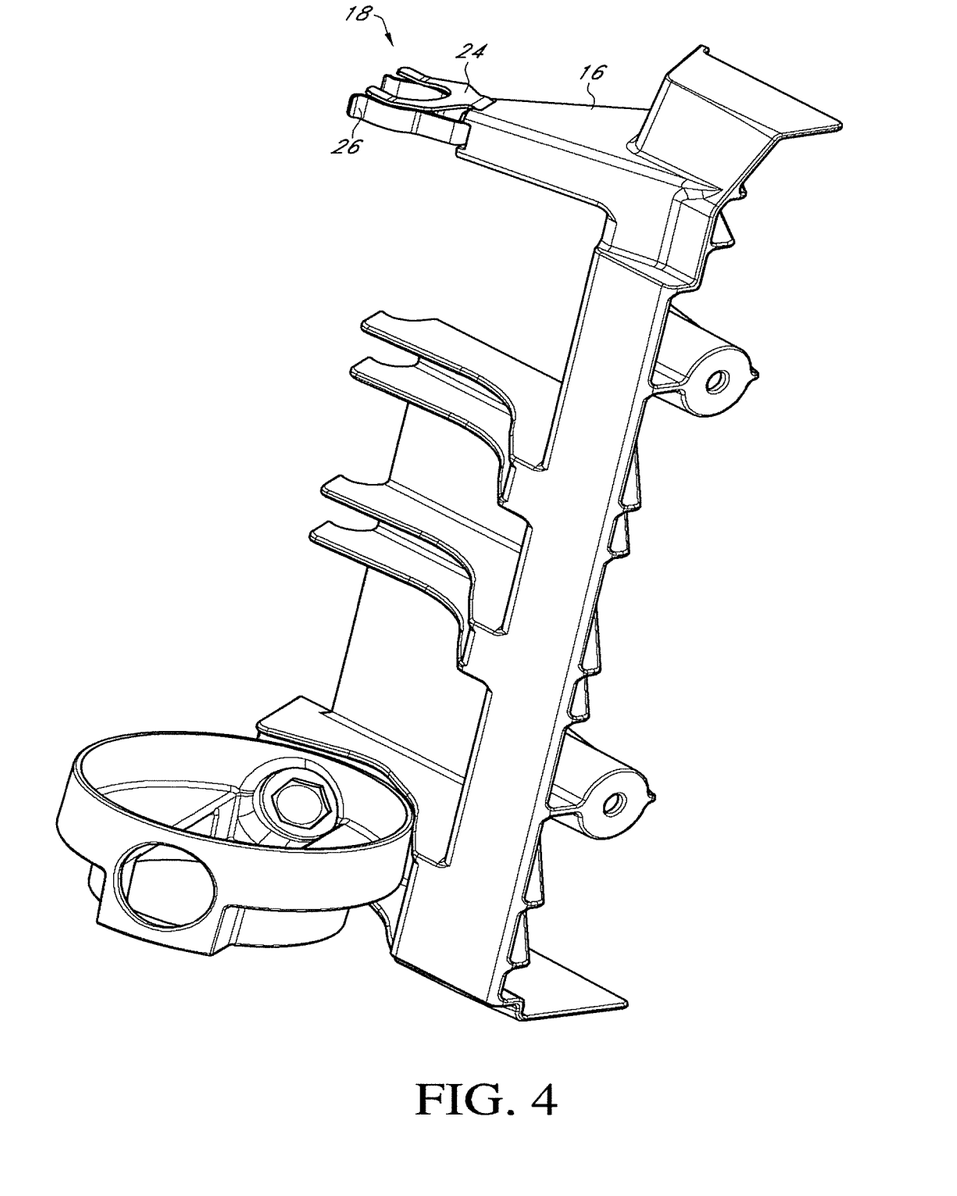
FIG. 4 is a perspective view of the apparatus from a different angle than FIG. 1 and FIG. 2.

FIG. 4 shows an embodiment of the arm 16 and the neck clamp 18 attached to the arm. The neck clamp can include two pieces: a collar 24 and a clamp 26. The collar 24 can be a u-shaped component made of metal or plastic or any suitable material. The clamp 26 is configured to receive the neck portion of a fire extinguisher. The clamp 26 is a tension clamp which operates such that when the neck of the fire extinguisher is pressed into the clamp 26, the clamp is tensioned around the neck of the fire extinguisher. It can be appreciated that when the tank is seated in either receptacle 20 or 22 (as appropriate), the neck of the fire extinguisher will snap into clamp 26 and collar 24 will exert a spring force on the fire extinguisher pushing it towards the endcap 14 so as to limit the fore and aft movement of the fire extinguisher in the bracket 10. The collar 26 receives the neck of the extinguisher and engages with a slot typically included on fire extinguishers (not shown)

Figure 5:
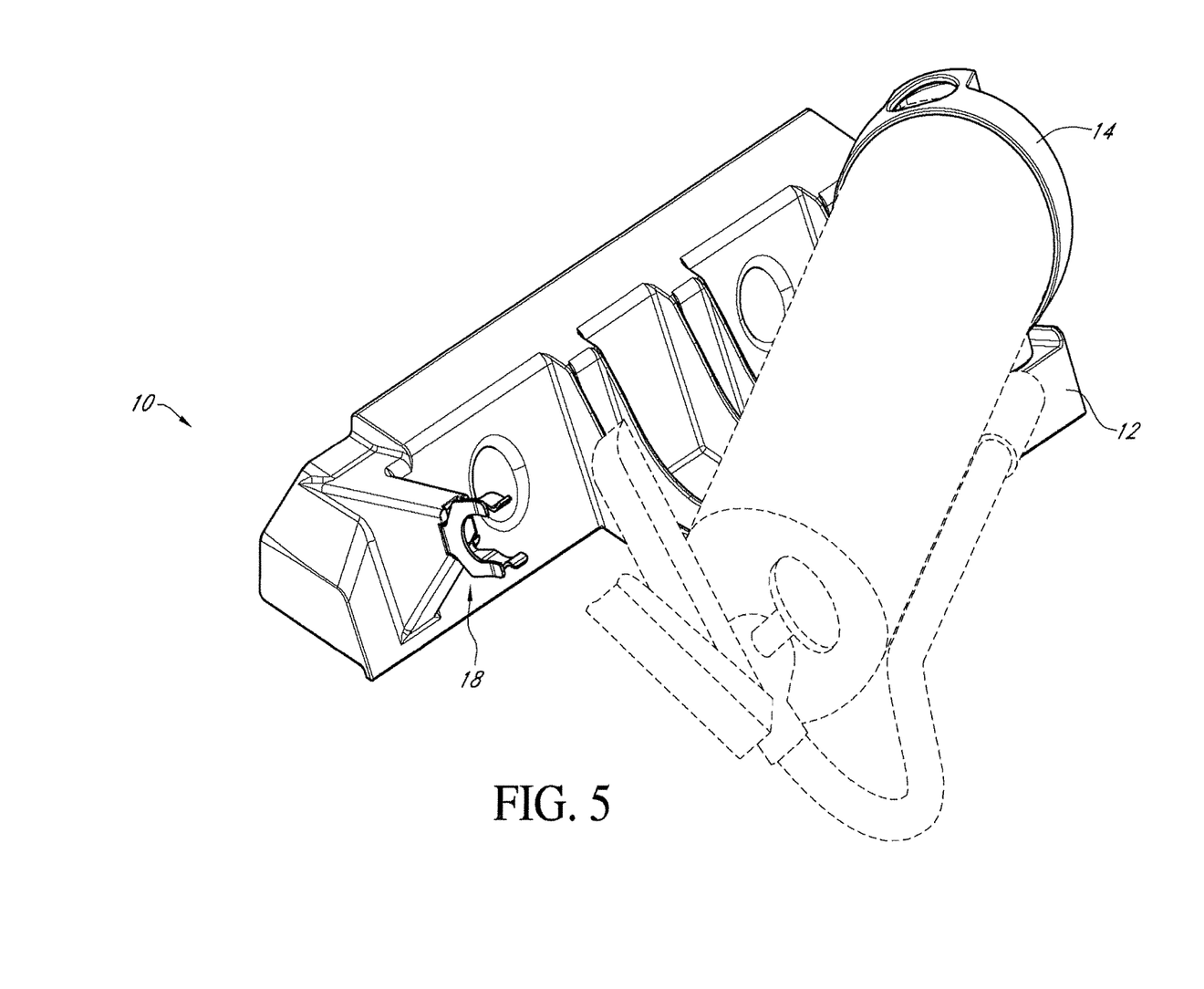
FIG. 5 is a perspective view of the apparatus with the larger diameter receptacle positioned for engagement with a fire extinguisher, where the fire extinguisher is shown in broken lines and the extinguisher is being rotated away from the neck clamp.

The disengagement of the fire extinguisher from the bracket 10 is best shown in FIG. 5. The fire extinguisher is first disengaged from the neck clamp 18. The user can simply pull the fire extinguisher neck out of the neck clamp. The fire extinguisher, which is still engaged with the receptacle 20 or 22 is then rotated away from the base 12. The endcap 14, as can be appreciated, is rotatable 360 degrees to allow for easy disengagement of the fire extinguisher from the bracket (and for easy selection of the appropriate receptacle). Once the fire extinguisher is rotated clear of the base 12, it can be removed from the receptacle 20 or 22 and easily manipulated for use by the user. Re-engagement of the fire extinguisher with the bracket 10 reverses those steps.

Figure 6:
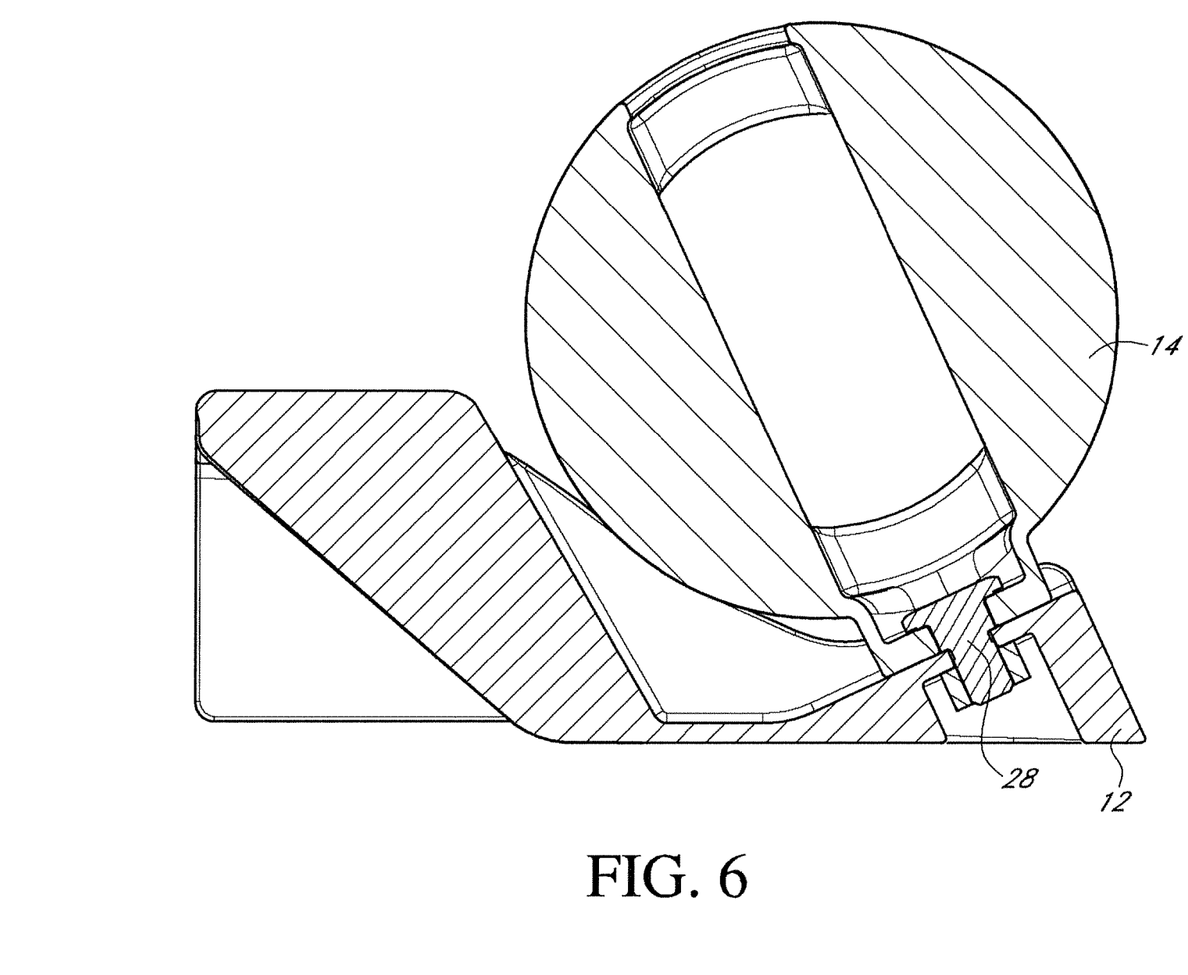
FIG. 6 is a cross section view of the endcap and pin.

As best shown in FIG. 6, the endcap 14 is attached to the base 12 with a pin 28 that allows the endcap to pivot or rotate with respect to the base 12 although it can be appreciated that any suitable fastener including a shoulder bolt may be used so long as the endcap 14 is able to pivot or rotate according to the objects of this invention.

It will be appreciated by those skilled in the art that various changes and modifications can be made to the illustrated embodiments without departing from the spirit of the present invention. All such modifications and changes are intended to be covered by the appended claims.

The invention claimed is:

1. A mourning bracket for a fire extinguisher comprising:
a base configured for attachment to a vehicle or seat;
an endcap pivotably mounted to the base on a pin, wherein the endcap includes two opposing hollow cylindrical receptacles, each having a different diameter and each accommodates a fire extinguisher tank,
wherein each receptacle is selectable for receiving the fire extinguisher tank by pivoting the endcap 180 degrees on the pin; and
a neck clamp engages a bottle neck on the fire extinguisher.

2. The mounting bracket of claim 1, wherein the mounting bracket comprises a collar that is configured to engage with the bottle neck on the fire extinguisher such that it urges the extinguisher towards the receptacle.

3. The mounting bracket of claim 2, wherein the mounting bracket further comprises a tension clip that is configured to tensibly receive the bottle neck of the fire extinguisher.

4. A fire extinguisher and fire extinguisher bracket comprising:
a fire extinguisher having a tank and a bottle neck;
a base configured for attachment to a vehicle or seat;
an endcap pivotably mounted to the base, wherein the endcap includes two opposing hollow cylindrical receptacles, each having a different diameter and each configured to accommodate the fire extinguisher tank,
wherein each receptacle is selectable for receiving the fire extinguisher tank by pivoting the endcap 180 degrees; and
a neck clamp configured to engage the bottle neck.

5. The mounting bracket of claim 4, wherein the bracket comprises a collar that is configured to engage with the bottle neck of the fire extinguisher such that it urges the extinguisher towards the receptacle.

6. The mounting bracket of claim 5, wherein the bracket further comprises a tension clip that is configured to tensibly receive the bottle neck of the fire extinguisher.

* * * * *